May 23, 1950     F. W. MOFFETT, JR     2,508,724
METHOD OF MAKING EDIBLE DISHES
Filed Dec. 13, 1946
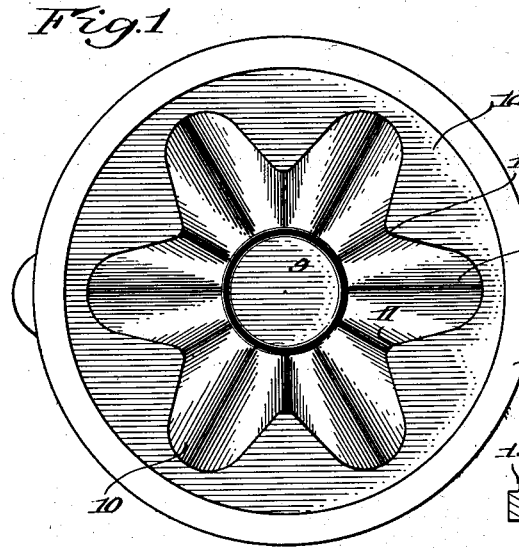
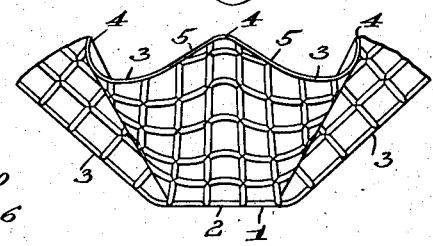
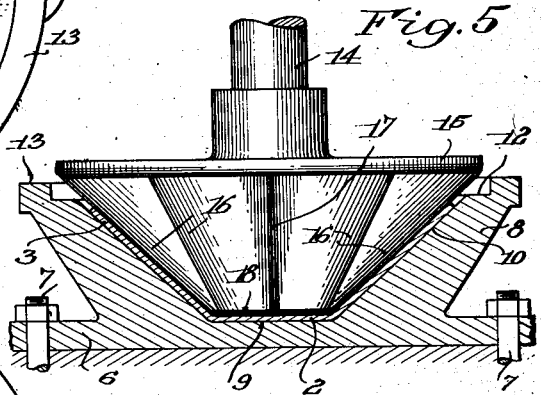
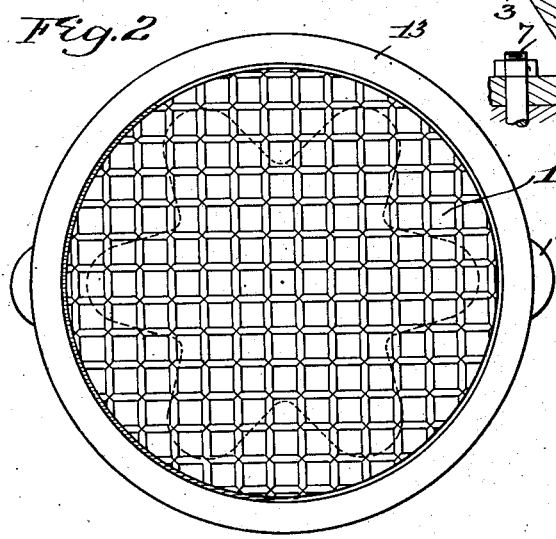
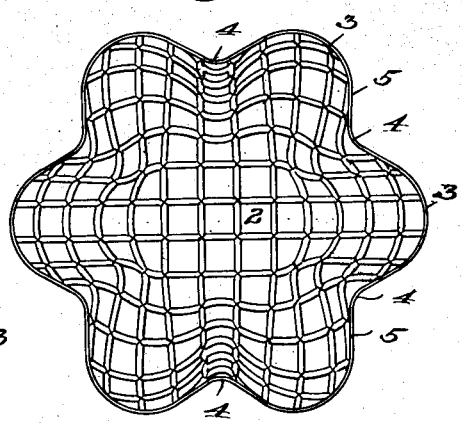
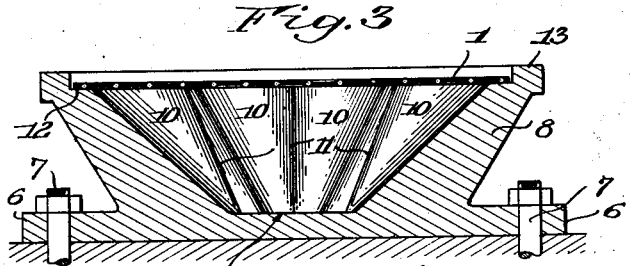
INVENTOR.
Frank Wesley Moffett, Jr.
BY Harold E. Stonebraker,
his Attorney Patented May 23, 1950

2,508,724

UNITED STATES PATENT OFFICE 2,508,724

METHOD OF MAKING EDIBLE DISHES

Frank Wesley Moffett, Jr., Gates, N. Y.

Application December 13, 1946, Serial No. 716,155

1 Claim. (Cl. 107—54)

This invention relates to an edible dish for holding desserts such as frozen custard, ice cream, and the like, and has for its purpose to provide a practical form of edible dish made from a sugar cake and a successful method of producing the same.

More particularly, the invention has for its purpose to afford an edible dish made from a sugar cake of a size and shape that permits resting it on a support or readily holding it in one's hand while eating the contents and having a greater capacity and being more efficient and convenient to handle than the conventional ice cream cone.

Heretofore edible ice cream containers made from sugar cakes have only been in the form of cones and containers of such shape are objectionable because not having a flat bottom, they must be constantly held while the dessert is being eaten, while there is a tendency for the contents to leak through the bottom of the cone and the capacity of such a cone is relatively small, and it is a more particular purpose of this invention to afford an edible dish made from a sugar cake having a flat bottom of substantial size and an inclined corrugated side wall in contrast with cones heretofore produced by winding a baked cake around a conical form, no method having previously been developed of shaping a sugar cake into a flat bottom dish with an inclined side wall.

Such edible dishes as have been made have not been formed from sugar cakes but have been baked into the final shape required, since it is impossible to bake a sugar cake of the desired shape because of the nature of the ingredients and the difficulty in removing such a cake from the form or mold after baking, and it is a further purpose of the invention to afford a practical method of shaping a sugar cake, after baking and before hardening, into a dish having a flat bottom and an inclined corrugated side wall.

More particularly, the invention is intended to produce a waffle-type of sugar cake with a relatively thin wall in the form of a dish with a circular flat bottom of substantial size, and an inclined side wall formed by radial corrugations, thus affording a container of substantial size with a closed bottom and a side wall that prevents spilling, and which successfully holds frozen custard or other dessert and is pleasant to eat with the dessert.

To these and other ends, the invention consists in the construction and method that will appear from the following description when read in conjunction with the accompanying drawings, the novel features being pointed out in the claim following the specification.

In the drawings:

Fig. 1 is a plan view of the female die employed for shaping a thin waffle-type sugar cake into a dish;

Fig. 2 is a plan view of the same, showing the waffle-type sugar cake after baking, and when first positioned on the female die, before the shaping operation;

Fig. 3 is a vertical central sectional view through Fig. 2, with the sugar cake in position on the female die preliminary to shaping;

Fig. 4 is a transverse sectional view of the waffle-type sugar cake used in making the dish;

Fig. 5 is a vertical sectional view taken centrally, showing the sugar cake between the dies after being shaped into dish form;

Fig. 6 is a side elevation of the completed dish, and

Fig. 7 is a plan view of the same.

Referring more particularly to the drawings in which like reference numerals refer to the same parts throughout the several views, the dish of the invention is preferably formed from a thin circular waffle-type sugar cake such as indicated at 1 in Figs. 2 to 4. The sugar cake 1 is shaped as shown in Figs. 5 to 7 by the mechanism presently to be described, and preferably includes a circular flat bottom wall 2 and a side wall formed by radial corrugations which are of transverse gradual concave curvature and the bottoms or outer portions of which, indicated at 3, are inclined to the bottom wall 2 at an angle of approximately 45°, while the innermost convex portions 4 of the corrugations are inclined to the bottom wall 2 at a somewhat sharper angle of approximately 67½°. Said outer and inner portions 3 and 4 respectively result from the radial inclined corrugations formed in the side wall, and include connecting walls 5, see Fig. 7, joining the outer and inner portions, thus affording a side wall with a series of radial inclined corrugations, the shape and proportions being such that the diameter of the bottom wall 2 is substantially equal to the height of the side wall.

The waffle-type sugar cake of which the dish is formed is of thin texture, as illustrated in Fig. 4, and by forming corrugations in the manner shown, it is possible to produce a side wall with sufficient inclination that will not readily fracture during the shaping operation or while in use, and also to impart such an angle of inclination to the side wall as to retain the contents when in liquid form and prevent ready spilling or overflowing if the dish is tipped slightly.

As a consequence, such a dish can be used successfully for holding frozen custard, ice cream, or the like, while the desert is being eaten, the dish being consumed along with the contents and the side wall functioning to retain the contents against spilling or overrunning until entirely consumed, while the flat bottom wall affords a closed bottom that is an effective barrier against leakage and which enables resting the dish on a flat surface or support when desired, thus overcoming serious objections to the conventional cone-shaped container.

In the structure shown, there are six corrugations, and this arrangement has been found to give satisfactory results in stiffness, preventing fracture, proper capacity, and efficient steepness of the side wall to obviate ready spilling, whereas if only four corrugations are formed, the side wall is more likely to permit ready spilling of the contents and the capacity of the dish is less. If eight or more corrugations are formed, the lateral bend of the side wall of the cake is too abrupt, causing excessive fracture in manufacture and use, and most satisfactory results have been had by using from five to seven corrugations. Such a structure imparts sufficient strength to the side wall to overcome excessive fracture, prevents overlapping of portions of the side wall of the cake due to bending, and gives sufficient steepness to prevent ready spilling of the contents while eating frozen custard or ice cream from the dish.

The dish is formed from a conventional waffle-type sugar cake of circular form such as illustrated in Figs. 2 to 4, which is produced according to well known methods and on conventional machines, an the thin circular waffle-type sugar cake disk is placed between shaping dies immediately upon removal from the baking apparatus and before it has become dry and hard. The dies are formed to accord to the sugar cake radial corrugations as described above, and this shaping of the circular sugar cake is preferably accomplished by means including a female die comprising a base 6 which can be fastened to any suitable support as by the bolts 7.

The female die further includes an upstanding portion on wall 8 that is recessed to afford a flat bottom 9, and upwardly and outwardly inclined pockets formed by transverse gradual concave curves 10, see Fig. 1, which are inclined at an angle of approximately 45° to the bottom 9, the pockets being connected at their inner portions by more sharply curved convex walls 11 which are inclined upwardly at an angle of approximately 67½° to the bottom 9.

The female die thus shapes the outer surface of the sugar cake dish and includes a flat bottom shaping surface and upwardly inclined transversely curved surfaces, the outermost portions of which incline more gradually while the innermost portions are somewhat steeper in order to accord the necessary strength and stiffness to the finished dish and to prevent spilling. The wall 8 terminates in a flat top surface 12 surrounded by an upstanding circular shoulder 13 which defines the circular area and outer limit of the flat surface 12 upon which the waffle-type sugar cake indicated at 1 is positioned, see Figs. 2 and 3, preliminary to the shaping operation.

The male die includes a suitable post or support 14 provided with a top flange 15, and inclined downwardly therefrom the transversely convex portions 16 that are complementary to the aforementioned pockets 10 of the female die and connected by the transversely concave recesses 17, that are complemental to the convex portions 11 of the female die, the portions 16 and 17 terminating in a flat bottom 18 that is complemental to the flat bottom 9 of the female die. The dies just described are preferably made of metal alloy or other suitable material and can be employed at normal room temperature without the necessity of heating or other treatment before shaping the sugar cake disk.

In operation, a circular waffle-type sugar cake, immediately upon removal from the baking machine, is positioned on the flat top surface 12 of the female die in the manner shown in Figs. 2 and 3, whereupon the male die is positioned over the sugar cake in a centered and complementary position with reference to the female die and moved downwardly, causing the sugar cake to assume the position illustrated in Fig. 5 between the respective dies. After the dies are permitted to remain in this position for a short period of time, the cake hardens sufficiently to retain the shape imparted to it, as shown in Figs. 6 and 7, whereupon the male die is lifted and the cake dish can be removed from the female die without difficulty.

The dish is then ready for use and is particularly adapted for holding frozen custard or other semi-hard liquid dessert, being supportable on a flat surface and also adapted to be held readily and conveniently without spilling its contents. The dish affords a pleasing and palatable cake that can be eaten at the same time with the dessert, without the disadvantages and undesirable features that necessarily characterize the conventional type of ice cream cone.

While the invention has been described in connection with a particular procedure and structure, it is not confined to the details illustrated, and this application is intended to cover such changes and departures as may come within the purposes of the improvements and the scope of the following claim.

I claim:

The method of producing an edible dish which consists in baking a thin flat waffle-type sugar cake, positioning said sugar cake horizontally, inclining the outer marginal portion thereof into a side wall and forming said marginal portion into uniformly and regularly curved, relatively wide radial undulations varying from approximately 45° to 67½° with respect to the horizontal bottom portion, said inclining and undulating operations being performed immediately after the sugar cake is baked and before it is dry and hard.

FRANK WESLEY MOFFETT, JR.

REFERENCES CITED

The following references are of record in the file of this patent:

UNITED STATES PATENTS

| Number | Name | Date |
| --- | --- | --- |
| 913,597 | Westling | Feb. 23, 1909 |
| 1,219,711 | Davoust | Mar. 20, 1917 |
| 1,529,107 | Backus | Mar. 10, 1925 |
| 1,936,835 | Fairchild | Nov. 28, 1933 |
| 2,004,530 | Howe et al. | June 11, 1935 |